United States Patent
Nachenberg et al.

(10) Patent No.: US 9,740,876 B1
(45) Date of Patent: Aug. 22, 2017

(54) SECURELY STORING AND PROVISIONING SECURITY TELEMETRY OF MULTIPLE ORGANIZATIONS FOR CLOUD BASED ANALYTICS

(71) Applicant: Symantec Corporation, Mountain View, CA (US)

(72) Inventors: Carey S Nachenberg, Manhattan Beach, CA (US); Paul M Agbabian, Los Angeles, CA (US); Abubakar A Wawda, Cupertino, CA (US); Andrew Collingwood Watson, Cheltenham (GB)

(73) Assignee: Symantec Corporation, Mountain View, CA (US)

( * ) Notice: Subject to any disclaimer, the term of this patent is extended or adjusted under 35 U.S.C. 154(b) by 42 days.

(21) Appl. No.: 14/855,194

(22) Filed: Sep. 15, 2015

(51) Int. Cl.
| | |
|---|---|
| *G06F 21/00* | (2013.01) |
| *G06F 21/62* | (2013.01) |
| *H04Q 9/00* | (2006.01) |
| *G06F 21/55* | (2013.01) |

(52) U.S. Cl.
CPC ........ *G06F 21/6218* (2013.01); *G06F 21/554* (2013.01); *G06F 21/62* (2013.01); *H04Q 9/00* (2013.01)

(58) Field of Classification Search
CPC ...... G06F 21/552; G06F 21/554; G06F 21/62; G06F 21/6245; G06F 21/6254; H04L 63/10; H04L 63/1416; H04L 63/1425; H04L 63/1433
See application file for complete search history.

(56) References Cited

U.S. PATENT DOCUMENTS

2011/0225200 A1* 9/2011 Danis .................... G06Q 10/10 707/783
2015/0222656 A1* 8/2015 Haugsnes ........... H04L 63/1441 726/23

* cited by examiner

*Primary Examiner* — Edward Zee
(74) *Attorney, Agent, or Firm* — Patent Law Works LLP (57) ABSTRACT

A cloud based system receives multiple types of security telemetry from multiple participating organizations. The received security telemetry can be pseudonymized by replacing fields containing sensitive information with corresponding pseudonyms. Two data stores can be maintained, a first for raw telemetry, and a second for pseudonymized telemetry. Each data store can comprise a directory structure organized according to factors such as originating organization, administrative unit, telemetry type, schema, format and/or version and receipt time. Raw telemetry is stored in directories of the first data store, and pseudonymized security telemetry is stored in directories of the second data store, both organized according to the above-described factors. Analytics of the telemetry is facilitated by providing controlled access to analytics clients, according to permissions granted by the originating organizations and declared requirements of the analytics clients, at levels of granularity based on the above described factors and pseudonymization status.

20 Claims, 3 Drawing Sheets

SECURELY STORING AND PROVISIONING SECURITY TELEMETRY OF MULTIPLE ORGANIZATIONS FOR CLOUD BASED ANALYTICS

TECHNICAL FIELD

This disclosure pertains generally to computer security, and more specifically to securely storing and provisioning pseudonymized security telemetry of multiple organizations, and facilitating cloud based security analytics.

BACKGROUND

Enterprises and other organizations typically have computer security infrastructure installed on their networks, such as firewalls, network intrusion detection systems (IDS), network intrusion prevention systems (NIPS), etc. These and other systems collect and log large amounts of data concerning network traffic and events occurring on the various types of computing and networking systems of the organization. Often, such information is significant to the organization's security configuration, indicating factors such as vulnerabilities, contexts, effective and ineffective configurations, successful and blocked attacks, etc. Collected data concerning networking and computing events of importance to the computer security of an organization are referred to herein as "security telemetry." Security telemetry can be in the form of monitoring data from firewalls, IDS/IPS, vulnerability scanners and the like, log data from network devices (e.g., routers, switches, etc.), servers, endpoints and other computing devices, scanning or other assessment data from cloud, server or endpoint based security systems, etc. Analysis of and intelligence concerning collected security data is also a form of security telemetry.

Many organizations collect such large amounts of security telemetry automatically that it becomes impracticable to analyze or process by the organization, or by using conventional database or enterprise level security tools. It is thus frequently desirable to utilize an outside cloud based security telemetry analytics facilitator, with the ability to process petabytes of data, perform meaningful analysis of these large amounts of varied data, and provide organizations with the ability to query their large volumes of security telemetry in useful ways. Moreover, cloud based analytics facilitators process and store security telemetry for multiple enterprises, which creates concerns about exposing confidential information between parties when making the security telemetry available to its owners and other authorized entities such as third party analytics providers.

Securely storing and provisioning large amounts of security telemetry provided by multiple independent entities creates a number of challenges that it would be desirable to address.

SUMMARY

Security telemetry of multiple participating organizations is securely stored and provisioned, thereby facilitating secure, cloud based analytics of security telemetry sent by multiple independent entities. More specifically, a cloud based system can receive multiple types of security telemetry from a plurality of administrative units of a plurality of participating organizations in a plurality of formats. Updated security telemetry can be received from the participating organizations periodically so that the cloud based system stays current. The raw, received security telemetry contains various fields of sensitive information. In some embodiments, one or more of the organizations redact or pseudonymize at least some of the sensitive information in their security telemetry before transmitting it to the cloud, based on their internal policies. In other embodiments some organizations direct the cloud based system to automatically redact or pseudonymize some sensitive information in their security telemetry upon receipt according to their policies. Such security telemetry is still classified and processed as raw security telemetry by the cloud based system.

In some embodiments, the received security telemetry is pseudonymized by replacing fields containing sensitive information with corresponding pseudonyms, such that the sensitive information contained in the pseudonymized fields is not present in the pseudonymized security telemetry. Each instance of the same field value (e.g., a name like Joe Smith) is replaced with the same specific pseudonym (e.g., USER1234) across all telemetry bearing that field value.

In one embodiment, two data stores are maintained, a first data store for raw security telemetry, and a second data store for pseudonymized security telemetry. In one embodiment, each data store comprises a directory structure organized according to originating organization, telemetry type and/or format (e.g., format, schema, type and/or version of the telemetry), administrative unit (e.g., administrative domain or region from within the sending organization, such as European Union, US-EAST, US-WEST, manufacturing, human resources, etc.), and in some cases by other factors such as telemetry receipt time. Raw security telemetry is stored in directories of the first data store, and pseudonymized versions of the same security telemetry are stored in directories of the second data store, both organized according to factors such as originating organization, administrative unit, telemetry type and/or format and receipt time. In other embodiments, different storage architectures are utilized, such as one or more commingled tables indexed according to factors such as submitting organization and/or telemetry type, such that a relevant subset of a given organization's telemetry can be readily and quickly extracted.

The cloud based system facilities cloud based security analytics of the stored security telemetry, by providing controlled access to one or more analytics clients, which perform analytics on the security telemetry held in the data stores. This provided access is controlled according to factors such as originating organization, administrative unit, telemetry type and/or format and pseudonymization status. Each analytics client provides the cloud based security system with a specified set of classes of security telemetry that it requires in order to perform its analytics. Organizations wishing to use an analytics client then grant access permissions for their telemetry to the specific analytics client they wish to subscribe to. More specifically, one or more organizations may make specific grants of access permission to one or more analytics clients, to access at least some of the security telemetry contributed by each respective organization. The cloud based system then provides each specific analytics client controlled access to the stored security telemetry according to the intersection of the specified set of classifications of security telemetry for the specific analytics client, and the grants of access permission for the specific analytics client from one or more of the organizations.

The granted access control privileges limit the analytics client's access to security telemetry from a particular set of originating organizations, and for each organization, to a particular set of administrative units, and further to a particular set of types or schemas. For example, when an analytics client wishes to analyze security telemetry, it can issue a query for security telemetry in order to obtain a relevant subset of data required for its analytics. Such a query is limited to the subset of security telemetry to which the analytics client has been granted access privileges. In another embodiment, an analytics client could run a "job" (e.g., a map-reduce Java application) directly on top of the data store(s), with the job's access to the security telemetry in the data stores being limited according to the access control privileges of the analytics client. For example, the Java application's visibility could be limited to only security telemetry within the data stores to which the analytics client has access privileges.

Because stored security telemetry is organized (e.g., into separate file-system directories) according to the aforementioned categories (e.g., sending organization, administrative domain, schema, time), granular access can be granted to any subset of the security telemetry through, e.g., the use of file-system-based permissions, rather than more complex and slow intra-file-level controls (e.g., access at an individual row level).

Expired security telemetry can be managed by deleting security telemetry in, e.g., directories indicative of time received that exceeds a given retention period. If a particular user ends its participation in the cloud based system, its security telemetry can be deleted by deleting, e.g., directories in each data store pertaining to the particular organization, and all subdirectories thereof.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
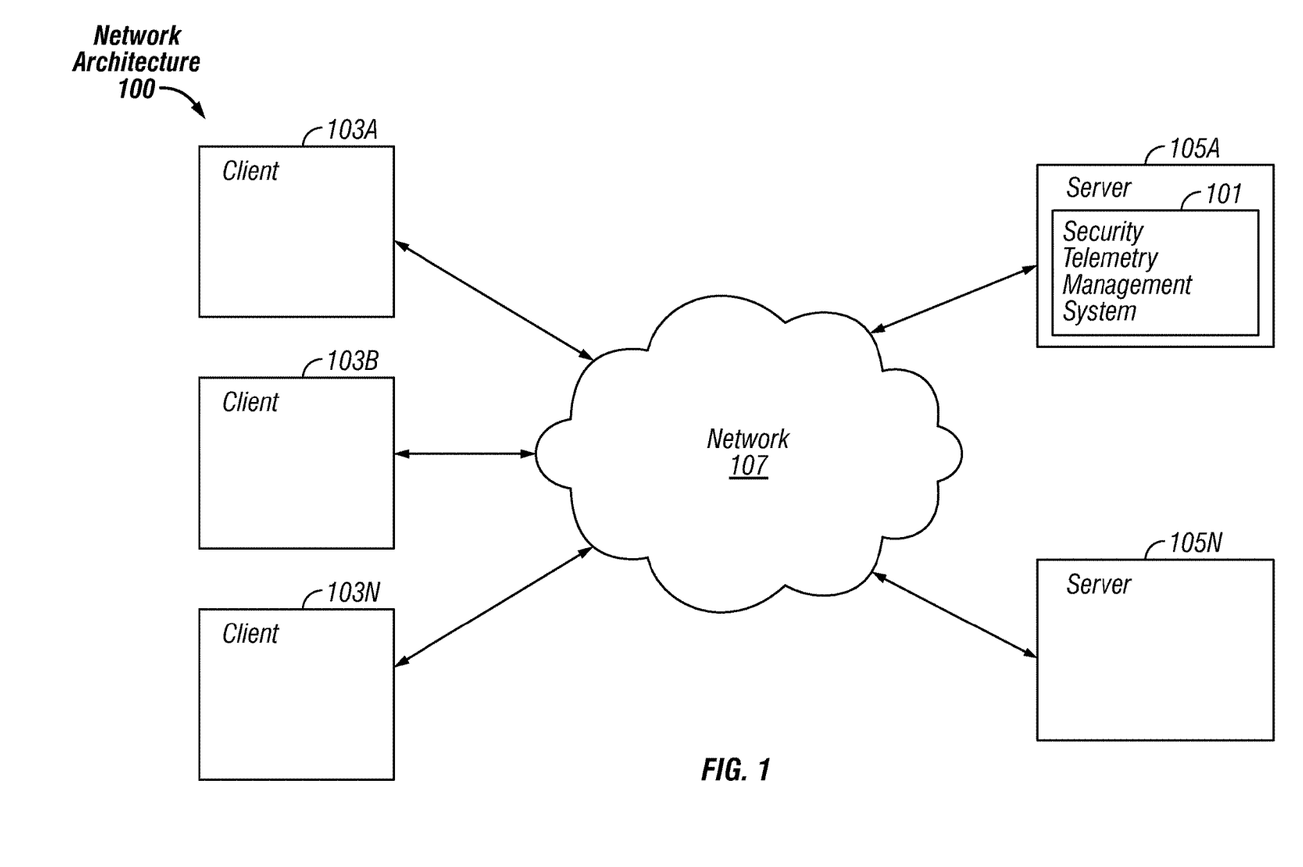
FIG. 1 is a block diagram of an exemplary network architecture in which a security telemetry management system can be implemented, according to some embodiments.

FIG. 1 is a block diagram illustrating an exemplary network architecture 100 in which a security telemetry management system 101 can be implemented. The illustrated network architecture 100 comprises multiple clients 103A, 103B and 103N, as well as multiple servers 105A and 105N. In FIG. 1, the security telemetry management system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
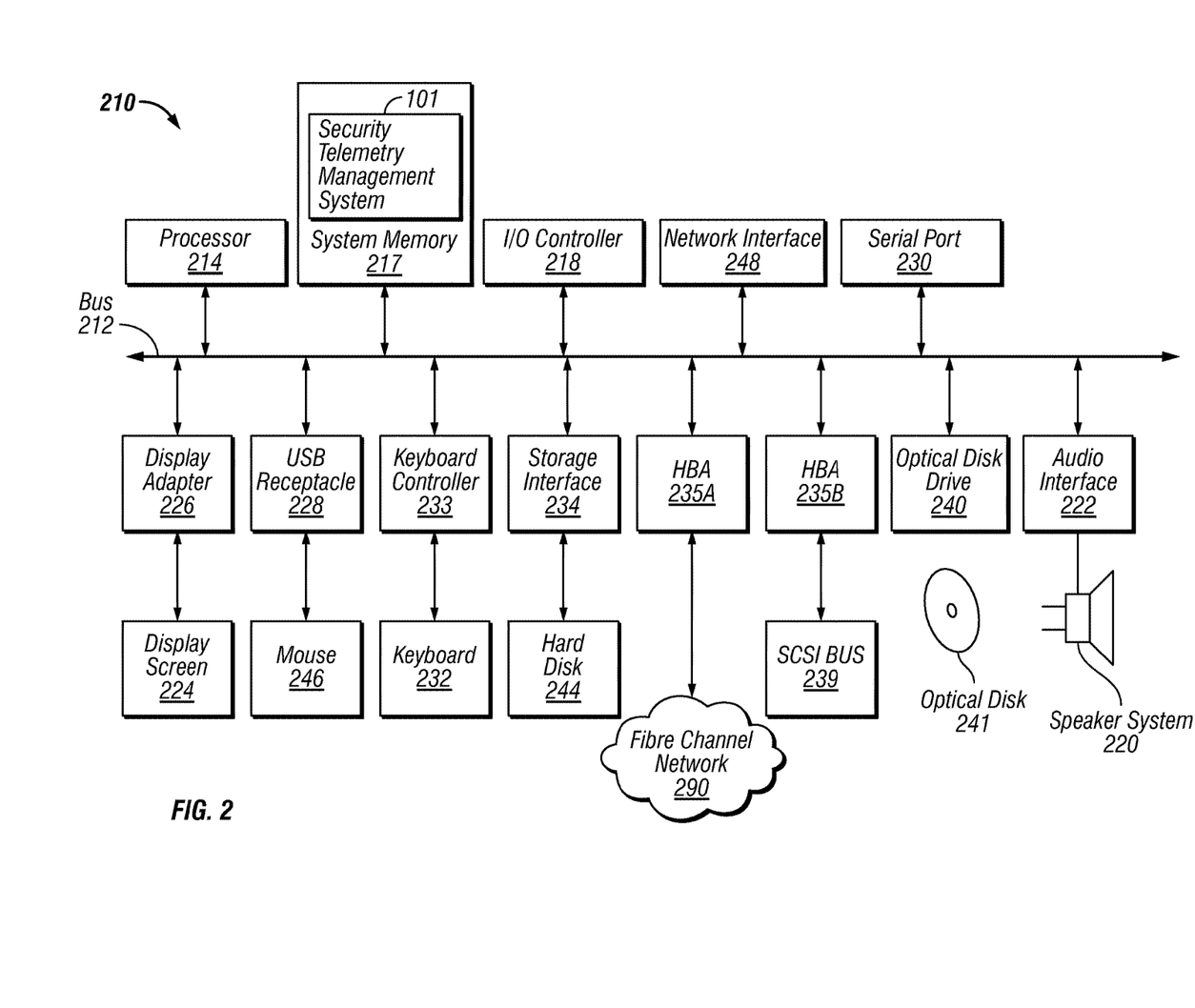
FIG. 2 is a block diagram of a computer system suitable for implementing a security telemetry management system, according to some embodiments.

FIG. 2 is a block diagram of a computer system 210 suitable for implementing a security telemetry management system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the security telemetry management system 101 is illustrated as residing in system memory 217. The workings of the security telemetry management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
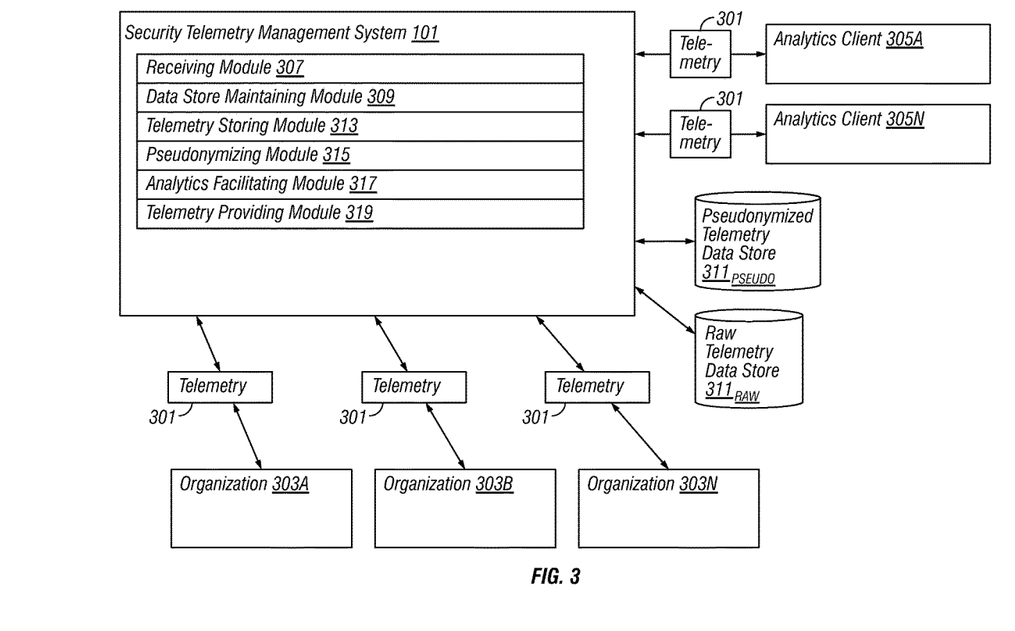
FIG. 3 is a high level block diagram of the operation of a security telemetry management system, according to some embodiments.

FIG. 3 illustrates the operation of a security telemetry management system 101 running on a server 105 and communicating through a network 107 (e.g., the Internet) with multiple analytics clients 305. As described in detail below, the security telemetry management system 101 can securely store and provision security telemetry 301 received from multiple independent organizations 303, and facilitate cloud based security analytics of the security telemetry 301.

As described above, the functionalities of the security telemetry management system 101 can reside on specific computers 210 or be otherwise distributed between multiple computer systems 210, including within a fabric/cloud-based computing environment in which the functionality of the security telemetry management system 101 is provided as a cloud based service over a network 107 to various analytics clients 305. It is to be understood that although the security telemetry management system 101 is illustrated in FIG. 3 as a single entity, the illustrated security telemetry management system 101 represents a collection of functionalities, which can be instantiated as a single or multiple modules as desired (instantiation of a specific, multiple module security telemetry management system 101 is illustrated in FIG. 3). It is to be understood that the modules of the security telemetry management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the security telemetry management system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

FIG. 3 illustrates the security telemetry management system 101 receiving security telemetry 301 from three organizations 303A, 303B and 303N. It is to be understood that when deployed in the field, the security telemetry management system 101 can interact with orders of magnitude more organizations 303 (e.g., hundreds, thousands, hundreds of thousands, etc.). As the term is used herein, an organization 303 can be any entity which maintains at least one networked computer 210 with administrated computer security infrastructure. One example of an organization 303 is a corporation or other commercial enterprise that maintains a professionally administrated and secured computer network 107. Universities, government institutions, and other educational and/or not-for-profit bodies are other examples of organizations 303. Organizations 303 can vary in size from a small business (or even a private home) network 107 consisting of a half dozen or so networked computers 210 to an international corporation or other enterprise with millions of networked devices 210. FIG. 3 also illustrates two third party analytics clients 305A and 305N. In practice, more (or fewer) third party analytics clients 305 can communicate with the security telemetry management system 101 in order to analyze subsets of security telemetry 301 to which they have been granted access. Third party analytics clients 305 are discussed in greater detail below.

A receiving module 307 of the security telemetry management system 101 receives security telemetry 301 from multiple participating organizations 303. On the organization 303 end, deployed organization and/or endpoint level security products can be set to transmit this security telemetry 301 to the centralized, cloud based security telemetry management system 101. The telemetry receiving module 307 can be provided with updated telemetry 301 periodically, thereby maintaining current information from the various organizations 303. The frequency at which organizations transmit updated telemetry 301 is a variable design parameter, which can be set as desired according to different scenarios.

The type, content and format of the security telemetry can vary between originating organizations 303, and within a given organization 303 as well. As described above, security telemetry 301 can be in the form of, for example, monitoring data from firewalls, IDSs, IPSs or the like, log data from network or other computing devices (e.g., routers, switches, servers, endpoints, etc.), security system generated scanning or other assessment data, etc. A single organization 303 can send different types of security telemetry 301 (e.g., firewall data, IPS events, logged network packets, etc.), and the types of security telemetry received from different organizations 303 also typically vary. Likewise, organizations 303 can transmit security telemetry 301 in multiple formats (e.g., SNORT schema, Intrusion Detection Message Exchange Format, etc.), or in a single canonical format. Additionally, multiple administrative units (e.g., departments, geographical or regional offices or centers, etc.) within a single organization 303 can provide security telemetry 301 to the security telemetry management system 101.

In some instances, organizations 303 can redact sensitive information from their security telemetry 301, and/or replace sensitive information with pseudonyms prior to transmitting it to the security telemetry management system 101. Sensitive information can comprise, for example, personally identifiable information (PPI), which is information which can be used to identify, contact, or locate an individual (e.g., email address, login name, digital identity, social security number, credit card number, etc.) or confidential or privileged information concerning the organization 303 or its computing infrastructure (e.g., network addresses, device identifiers, etc.). It is to be understood that pseudonymization is reversible. In other words, a contributing party can reconstruct the original, non-pseudonymized identity if required, for instance if a security incident is detected through analysis of the security telemetry 301, and the contributing party wishes to determine the identity of the user that was responsible for the incident. In some embodiments, organization driven pseudonymization and/or redaction of security telemetry 301 can be performed automatically by the security telemetry management system 101 upon receipt (as opposed to on the organization 303 end), based on policy directives of the participating organization 303 from which the security telemetry 301 originated.

As described in detail below, in some embodiments the security telemetry management system 101 further pseudonymizes all received security telemetry 301, and separately maintains a raw version and a pseudonymized version (e.g., in a raw telemetry data store $311_{RAW}$ and a pseudonymized telemetry data store $311_{PSEUDO}$, as described below). It is to be understood that any pseudonymization performed directly by an organization 303 itself (or automatically performed by the security telemetry management system 101 on the organization's behalf prior to other processing) is distinct from the pseudonymization of all security telemetry 301 executed by the security telemetry management system 101 prior to storing the pseudonymized security telemetry 301, e.g., in the pseudonymized telemetry data store $311_{PSEUDO}$.

In one embodiment, a data store maintaining module 309 of the security telemetry management system 101 maintains two security telemetry data stores 311. One, which is referred to herein as the raw telemetry data store $311_{RAW}$, holds the security telemetry 301 as received from the originating organization 303. Thus, the security telemetry 301 stored in the raw telemetry data store $311_{RAW}$ contains all sensitive information within the security telemetry 301, other than that which an organization 303 pseudonymized or redacted itself before transmission, or directed the security telemetry management system 101 to do on receipt. This security telemetry 301 is referred to herein as raw security telemetry $301_{RAW}$. It is to be understood that raw security telemetry $301_{RAW}$ can have some sensitive information pseudonymized or redacted, where that was done by the organization itself prior to transmission. In addition, as noted above, in some embodiments the telemetry management system 101 can perform some pseudonymization on behalf of organizations 303 according to their policy directives, prior to the separate pseudonymization processing discussed below. In these embodiments, the security telemetry 301 that has been subject to this pre-preprocessing pseudonymization is still considered raw security telemetry $301_{RAW}$, and is treated as such.

The second security telemetry data store, referred to herein as the pseudonymized telemetry data store $311_{PSEUDO}$, holds security telemetry 301 for which the remaining sensitive information is replaced with pseudonyms by the security telemetry management system 101, as described in more detail below. In one embodiment, some or all received security telemetry 301 is not pseudonymized. In one embodiment, the data stores 311 are organized as hierarchical directory structures, which are used to control access and other management functions concerning the stored security telemetry 301 as described in greater detail below. These hierarchical directory structures can be organized according to properties such as originating organization (e.g., the specific company that transmitted the telemetry 301), administrative unit (e.g., administrative domain or region from within the sending organization, such as European Union, US-EAST, US-WEST, manufacturing, human resources, etc.), the type, schema, format and/or version of the telemetry (e.g., SNORT schema, raw firewall logs, etc.), pseudonymization status, and date/time received. This can be accomplished via a directory structure like: /pseudostatus/organization-id/administrative-unit/schema-type/starttime-endtime. This is just an example directory structure, and in practice more (or fewer) subdirectory levels can be used as desired. For example, administrative-unit could be broken into multiple levels (e.g., /geo-region/department or the like), and the format and/or type of the security telemetry 301 can be tracked at any desired level of granularity (e.g., one level for format versus multiple levels such as /type/format/version). Needless to say, the example directory names given herein are just that, examples, and other names can be used in different embodiments. In one embodiment, the data stores 303 are implemented using Hadoop Distributed File System ("HDFS"). Other suitable platforms are used in other embodiments as desired (e.g., Ceph, DFS, GFS, ObjectiveFS, etc.).

In other embodiments, different storage mechanisms and/or organization schemes are utilized. For example, in one embodiment the security telemetry 301 from each organization 303 is stored in a commingled form (e.g., a single table), and organized by the identity of the submitting organization 303 and the telemetry type, such that a relevant subset of a given organization's telemetry 301 can be readily and quickly extracted from the commingled table. For example, in one embodiment a table containing all types of telemetry 301 from all submitting organizations 303 maintains two indexes, one for the submitting organization 303, and one for the telemetry type. Similarly, in another embodiment one table per telemetry type can be maintained, with all data of the specific telemetry type, submitted by different multiple organizations 303, hosted within the single corresponding table (not illustrated). In this embodiment, the telemetry 301 within each such table may be indexed or organized by originating organization 303. Given a request to extract or analyze a given type of telemetry 301 sent by a given organization 303, either of these approaches would enable the efficient extraction of just the relevant telemetry 301 for a specified organization 303, from amongst the larger set of commingled telemetry 301. These are non-exhaustive examples, and other storage architectures and organizations are possible in other embodiments. It is to be understood that where this specification describes an embodiment in which the storage of security telemetry 301 is organized in a hierarchical directory structure, other embodiments in which the storage of the telemetry 301 is organized in other ways are also possible.

In one embodiment, a telemetry storing module 313 of the security telemetry management system 101 stores the security telemetry 301 as received from the originating organizations 303 in the raw telemetry data store $311_{RAW}$, organized, e.g., in the above-described data structure hierarchy according to its origin, format, time of receipt, etc. In different embodiments, security telemetry 301 received from different organizations 303 can be stored at varying levels of granularity in the raw telemetry data store $311_{RAW}$ using, e.g., different subdirectories of the directory structure as desired (e.g., taking into account department and/or geographic region within the organization 303, etc.). As noted above, the security telemetry 301 stored in the raw telemetry data store $311_{RAW}$ contains PII and other sensitive information, except for any which was pseudonymized or redacted by the originating organization 303 before transmission (or, in some embodiments, that which the originating organization specifically directed the security telemetry management system 101 to pseudonymize or redact).

In some embodiments, a pseudonymizing module 315 of the security telemetry management system 101 pseudonymizes the raw security telemetry $301_{RAW}$. Pseudonymization is the process of replacing fields containing sensitive information (e.g., PII, confidential corporate identifiers, etc.) in a data record with one or more pseudonyms. Each instance of the same field value to be pseudonymized (e.g., a specific name such as Joe Smith) is replaced with the same specific pseudonym (e.g., USER1234) across all telemetry being pseudonymized and containing that field value. This process makes the data record less identifying. Which sensitive data fields to pseudonymize is a variable design parameter, but typically includes those that are highly indicative of private information. Once the pseudonymizing module 315 has replaced sensitive information in the raw security telemetry $301_{RAW}$ with corresponding pseudonyms, the sensitive information contained in the pseudonymized fields is no longer present in the resulting pseudonymized security telemetry $301_{PSEUDO}$.

The telemetry storing module 313 can store the pseudonymized security telemetry $301_{PSEUDO}$ in the pseudonymized telemetry data store $311_{PSEUDO}$, organized, e.g., in the above-described data structure hierarchy according to its origin, format, time of receipt, etc. As with the raw security telemetry $301_{RAW}$, in different embodiments pseudonymized security telemetry $301_{PSEUDO}$ can be stored at varying levels of granularity in the pseudonymized telemetry data store $311_{PSEUDO}$ using different subdirectories of the directory structure (or indexes of one or more comingled tables) as desired (e.g., taking into account department and/or geographic region with the originating organization 303, etc.). In some embodiments, pseudonymized security telemetry $301_{PSEUDO}$ can be organized and stored according to fields or degree of pseudonymization at varying levels of granularity. For example, in such an embodiment the pseudonymized telemetry data store $311_{PSEUDO}$ could contain multiple subdirectories organized in a desired hierarchy, indicative of the level of pseudonymization and/or specific fields pseudonymized as desired. As noted above, in some embodiments some or all received telemetry 301 is not pseudonymized.

As noted above, pseudonymization is reversible. A party that performed the pseudonymization and has both the pseudonyms and the content of the replaced fields or an appropriate encryption key can recreate the original data record. The security telemetry management system 101 has both the raw security telemetry data $301_{RAW}$ in the raw telemetry data store $311_{RAW}$, and the pseudonymized security telemetry $301_{PSEUDO}$ in the pseudonymized telemetry data store $311_{PSEUDO}$. Thus, once the security telemetry 301 has been processed and stored as described above, the security telemetry management system 101 is able to access either pseudonymized or raw versions of the security telemetry 301 without the overhead of pseudonymizing raw security telemetry $301_{RAW}$ every time a secure access operation is to be performed, or reversing pseudonymized security telemetry $301_{PSEUDO}$ in order to process the original content. The secure access and management of security telemetry by the security telemetry management system 101 is discussed in more detail below.

It is to be understood that the specific underlying directory architecture used to implement the two data stores 311 can vary between embodiments. For example, in one embodiment the raw telemetry data store $311_{RAW}$ and pseudonymized telemetry data store $311_{PSEUDO}$ are both implemented under a common parent directory in a structure such as /data-store/raw/organizations/other-fields and /data-store/pseudo/organizations/other-fields. In another embodiment, two fully separate directory structures are used. In another embodiment, two entirely different physical storage platforms are used to isolate the two data stores 311 for added security. In yet another embodiment, for each organization 303 the directory structure is of the form /organization/other-fields/raw and /organization/other-fields/pseudo. Various other directory structure arrangements are possible. As noted above, the storage of telemetry 301 can also be organized using formats other than directory structures. The underlying point is that the security telemetry 301 for each participating organization 303 is stored separately in both its raw and pseudonymized form, organized into one or more hierarchical directory structures or other distinct storage platforms according to various relevant factors such as the source organization, administrative domain or region from within the source organization, format, schema, type and/or version of the telemetry 301, time received, etc.

An analytics facilitating module 317 of security telemetry management system 101 facilitates cloud based security analytics of the stored security telemetry 301, by providing controlled access of the stored security telemetry 301 to one or more analytics clients 305. The analytics facilitating module 317 controls the access according to factors mapped to subdirectories (or indexes, etc.) of the data store(s) 311, such as originating organization 303, administrative unit, telemetry type and/or format and pseudonymization status. In one embodiment, the hierarchical directory structures described above which form the two data stores 311 enable the facilitation of secure, controlled provisioning of the security telemetry 301 to analytics clients 305, wherein the access is gated at any desired level of granularity, based on, e.g., sending organization 303, administrative unit, format, type/schema, and pseudonymization status, as represented by, e.g., the subdirectories of the data stores 311. When an analytics client 305 queries the security telemetry management system 101 for security telemetry 301 in order to perform its analytics (e.g., via a map-reduce job or HIVE query), the access is controlled according to the above-described factors, providing only the security telemetry 301 in the appropriate subdirectories (or other storage architecture) to the analytics client 305 in response to the query.

For example, analytics client 305A could be granted access to the pseudonymized SNORT events from the US Eastern Division of organization 303A, and the EU raw firewall telemetry of organization 303B. Of course this is just an example, and the analytics facilitating module 317 can provide controlled access to the security telemetry 301 of thousands of organizations 303 to thousands or more analytics clients 305, controlled according to any combination of the types of factors discussed above, at any level of granularity as desired based on the nature of the analytics to be performed, the polices of the various organizations 303, the permissions granted by those organizations 303 to each analytics client 305, etc. Because the secured access is gated as described herein, the accessing analytics clients 305 are only granted access to a particular subset of security telemetry 301 at a targeted level. This can be thought of as a silo of security telemetry 301 without any more sensitive information present than the originating organization's policy allows for the particular analytics being performed. It is to be understood that depending upon the nature of the analytics being performed, varying degrees of statistical utility can be lost by not making particular raw data available. Therefore, what to provide to which analytics clients 305 can be determined separately by each organization 303, based on the balance between statistical utility and sensitivity of the particular field for the particular analytics. In some embodiments, the security telemetry management system 101 provides defaults, which can be edited and customized by a given organization 303, for example by an administrator or the like.

As the term is used herein, "analytics client 305" means an entity that communicates with the security telemetry management system 101 over a network 107 and provides analytics concerning security telemetry 301. An analytics client 305 can be in the form of an entity that is commercially separate from the entity that provides the security telemetry management system 101, or can be in the form a separate service provided by the same company that provides the security telemetry management system 101. In some cases, some analytics provision can be conjoined with the security telemetry management system 101 itself, and performed by one or more modules thereof. Another name for an analytics client 305 is an "analytics app" or "analytics application."

More specifically, an analytics client 305 can be in the form of a type of analytics application or service, produced by the provider of the security telemetry management system 101, or by a third party (e.g., a corporation that markets an analytics-based product or service). Prior to being granted access to any security telemetry 301, each analytics client 305 declares an explicit set of classes of security telemetry 301 (e.g., types, fields, schemas) that it requests access to in order to perform its analytics, as well as whether each such telemetry class may be pseudonymized or must be in raw form (where applicable). Analytics clients 305 can further specify requested telemetry classes as being required or optional. The receiving module 307 of the security telemetry management system 101 receives all such specifications from the analytics clients 305.

Participating organizations 303 grant explicit permission to specific analytics clients 305 to access their security telemetry 301. No security telemetry 301 in the data stores 311 of the security telemetry management system 101 can be accessed by any analytics client 305 without the prior granting of permission by the originating organization 303. Such granting of permission may occur at a blanket level (e.g., specific analytics client 305A may access all requested telemetry types, both required and optional, from every one of organization's administrative units) or can be granular at any level (e.g., specific analytics client 305B may access only required telemetry types X and Y and optional telemetry type Z, and only from the organization's North American administrative domain, not from the EU domain). These permissions are received by the receiving module 307 from the participating organizations 303 and enforced accordingly. In embodiments in which security telemetry 301 in the data store(s) 311 is organized into separate file-system directories that correspond to the aforementioned categories (e.g., sending organization, administrative unit, schema, time, pseudonymization status, etc.), granular access can be granted to any subset of the security telemetry 301 through the use of file-system-based access permissions at a directory level, rather than more complex and slow intra-file-level controls (e.g., access at an individual row level). Note that a single entity may grant access to its security telemetry 301 to more than one analytics client 305, each with its own set of telemetry access requirements. Also, a given participating organization 303 can selectively grant permission to one analytics client 305 while denying access to another.

A telemetry providing module 319 of the security telemetry management system 101 uses the above-described data store(s) 311 and directory structure based access control (or other storage architecture) to provide cloud level security telemetry 301 to analytics clients 305 according to their requested sets of telemetry classes and corresponding granted access permissions, in a multi-tenant environment. The access of the security telemetry 301 by each analytics client 305 is controlled according to the intersection of the client's specified set of telemetry classes requested to perform its analytics, and the grants of access permission for the specific analytics client 305 by the various participating organizations 303. All this is done without the overhead associated with storing only raw data and filtering outgoing data based on the authorization status of the requester.

As one example, an analytics client 305 that has been granted specific access permission by one or more organizations 303 makes a query on the corresponding subset of the security telemetry 301 of those organizations 303, in order to enable it to perform its analytics. In response to receiving the query, the telemetry providing module 319 provides authorized security telemetry 301 to the analytics client 305 for processing. As described above, the provision of security telemetry 301 to analytics clients 305 can be controlled according to at least originating organization 303, administrative domain, telemetry type and/or format and pseudonymization status, by providing only security telemetry 301 in appropriate subdirectories. An analytics client 305 can in some cases directly access its permitted subset of security telemetry 301 through APIs, as a Hadoop or SPARK job might do. In another embodiment, an analytics client 305 may request access to batches of security telemetry 301 (e.g., a request for the last three months of data for the North American region of a specific organization 303). Such batch data can then be analyzed in a secondary system. Regardless, the analytics client 305 can process received security telemetry 301, and deliver an analytics service to the corresponding organization 303, e.g., through an interface such as a GUI (not illustrated). Analytics clients 305 can serve many use cases, such as producing reports, providing organizations 303 with what-if scenarios (e.g., "How would my security setting change if I switch from the high setting to the low setting?"), detecting new attacks, etc.

The security telemetry management system 101 is also able to leverage the organized storage architecture of security telemetry 301 (e.g., directory structure) to delete expired data, by deleting security telemetry 301 in, e.g., directories indicative of time received that exceeds a given retention period (e.g., as per customer policy, regional regulations, or a system default). Data retention policies for an organization can also vary based on administrative unit, telemetry type/schema, etc., at any level of granularity. The security telemetry management system 101 can also utilize the, e. g., directory structure data store architecture to conveniently delete all (or a given subset) of the security telemetry 301 of a particular subscribing organization that decides to leave the system. For example, responsive to a specific organization 303 cancelling or not renewing its participation, the, e.g., directory in each data store 311 pertaining to that organization 303 can be deleted, as well as all subdirectories.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for securely storing and provisioning security telemetry of multiple participating organizations, and facilitating cloud based analytics of security telemetry utilizing at least one analytics client, the method comprising:
   receiving, by a cloud based system, multiple types of security telemetry from a plurality of participating organizations;
   storing, by the cloud based system, received security telemetry organized according to at least corresponding ones of the plurality of participating organizations from which received security telemetry originated;
   receiving, by the cloud based system from each of the at least one analytics clients, a specified set of classes of security telemetry requested by the specific analytics client to perform its analytics;
   receiving, by the cloud based system from each specific one of the plurality of participating organizations, a corresponding specific grants of access permission for at least one specific analytics client to access at least some security telemetry of the specific participating organization, wherein different grants of different access permission are received from different ones of the plurality of participating organizations; and
   facilitating, by the cloud based system, cloud based security analytics of the stored security telemetry, by providing each of the at least one analytics clients controlled access to a subset of the stored security telemetry, the subset comprising only the stored security telemetry according to an intersection of the specified set of classes of security telemetry for the specific analytics client and the different grants of different access permission for the specific analytics client from different ones of the plurality of participating organizations.

2. The method of claim 1 further comprising:
   pseudonymizing, by the cloud based system, the received security telemetry by replacing fields containing sensitive information in the received security telemetry with corresponding pseudonyms, such that the sensitive information contained in the pseudonymized fields is not present in the pseudonymized security telemetry.

3. The method of claim 1 wherein providing controlled access of the stored security telemetry to analytics clients further comprises:
   controlling access to the security telemetry according to at least originating organization and pseudonymization status.

4. The method of claim 1 further comprising:
   further storing received security telemetry according to pseudonymization status; and
   further controlling provided access of security telemetry according to pseudonymization status.

5. The method of claim 1 wherein providing controlled access of the stored security telemetry to analytics clients further comprises:
   providing controlled access to security telemetry of different participating organizations to different analytics clients according to different corresponding specified sets and varying granted access permissions.

6. The method of claim 1 wherein providing controlled access of the stored security telemetry to analytics clients further comprises:
   providing controlled access of security telemetry of a single participating organization to different analytics clients at varying levels of granularity.

7. The method of claim 1 wherein providing controlled access of the stored security telemetry to analytics clients further comprises:
   providing controlled access of security telemetry of different participating organizations to a single analytics client at varying levels of granularity.

8. The method of claim 1 further comprising:
   further storing received security telemetry according to telemetry type, schema, format and/or version; and
   further controlling provided access of security telemetry according to telemetry type, schema, format and/or version.

9. The method of claim 1 further comprising:
   further storing received security telemetry according to administrative unit; and
   further controlling provided access of security telemetry according to administrative unit.

10. The method of claim 1 further comprising:
   storing received security telemetry in a hierarchical directory structure organized at least according to originating organization and telemetry type; and
   controlling access to the security telemetry by using file-system-based access permissions to control access to specific directories of the hierarchical directory structure organized according to at least originating organization and telemetry type.

11. The method of claim 1 wherein receiving multiple types of security telemetry from a plurality of participating organizations further comprises:
   periodically receiving updated security telemetry from participating organizations.

12. The method of claim 1 further comprising:
   receiving, from at least one participating organization, security telemetry from which at least some sensitive information has been redacted or pseudonymized by the at least one participating organization prior to transmission to the cloud based system; and
   storing, by the cloud based system, the received redacted or pseudonymized security telemetry organized according to at least originating organization.

13. The method of claim 1 further comprising:
   automatically pseudonymizing or redacting security telemetry received from at least one participating organization, by the cloud based system, based on at least one policy directive of the at least one participating organization; and
   storing, by the cloud based system, the automatically redacted or pseudonymized security telemetry organized according to at least originating organization.

14. The method of claim 1 further comprising:
   further organizing stored security telemetry according to time of receipt; and deleting security telemetry indicative of time received that exceeds a given retention period.

15. The method of claim 1 further comprising:
deleting security telemetry of a particular organization no longer participating in the cloud based analytics of security telemetry.

16. The method of claim 1 further comprising:
storing, by the cloud based system, raw received security telemetry in a first data store, organized according to at least originating organization and telemetry type; and
storing, by the cloud based system, pseudonymized security telemetry in a second data store, organized according to at least originating organization and telemetry type.

17. The method of claim 1 further comprising:
storing, by the cloud based system, received security telemetry from multiple ones of the plurality of participating organizations in a single table, indexed according to originating organization.

18. At least one non-transitory computer readable medium for securely storing and provisioning security telemetry of multiple participating organizations, and facilitating cloud based analytics of security telemetry utilizing at least one analytics client, the at least one non-transitory computer readable medium storing computer executable instructions that, when loaded into computer memory and executed by at least one processor of at least one computing device, cause the at least one computing device to perform the following steps:
receiving multiple types of security telemetry from a plurality of participating organizations;
storing received security telemetry organized according to at least corresponding ones of the plurality of participating organizations from which received security telemetry originated;
receiving from each of the at least one analytics clients, a specified set of classes of security telemetry requested by the specific analytics client to perform its analytics;
receiving from each specific one of the plurality of participating organizations, a corresponding specific grants of access permission for at least one specific analytics client to access at least some security telemetry of the specific participating organization, wherein different grants of different access permission are received from different ones of the plurality of participating organizations; and
facilitating cloud based security analytics of the stored security telemetry, by providing each of the at least one analytics clients controlled access to a subset of the stored security telemetry, the subset comprising only the stored security telemetry according to an intersection of the specified set of classes of security telemetry for the specific analytics client and the different grants of different access permission for the specific analytics client from different ones of the plurality of participating organizations.

19. The at least one non-transitory computer readable medium of claim 18 further storing computer executable instructions for:
pseudonymizing, by the cloud based system, the received security telemetry by replacing fields containing sensitive information in the received security telemetry with corresponding pseudonyms, such that the sensitive information contained in the pseudonymized fields is not present in the pseudonymized security telemetry.

20. A computer system for securely storing and provisioning security telemetry of multiple participating organizations, and facilitating cloud based analytics of security telemetry utilizing at least one analytics client, the computer system comprising:
a processor;
system memory;
a receiving module residing in the system memory, the receiving module being programmed to receive multiple types of security telemetry from a plurality of participating organizations, to receive from each of the at least one analytics clients, a specified set of classes of security telemetry requested by the specific analytics client to perform its analytics, and to receive from each specific one of the plurality of participating organizations, a corresponding specific grants of access permission for at least one specific analytics client to access at least some security telemetry of the specific participating organization, wherein different grants of different access permission are received from different ones of the plurality of participating organizations;
a telemetry storing module residing in the system memory, the telemetry storing module being programmed to store received security telemetry organized according to at least corresponding ones of the plurality of participating organizations from which received security telemetry originated; and
an analytics facilitating module residing in the system memory, the analytics facilitating module being programmed to facilitate cloud based security analytics of the stored security telemetry, by providing each of the at least one analytics clients controlled access to a subset of the stored security telemetry, the subset comprising only the stored security telemetry according to an intersection of the specified set of classes of security telemetry for the specific analytics client and the different grants of different access permission for the specific analytics client from different ones of the plurality of participating organizations.

* * * * *